(12) United States Patent
Silverstein et al.

(10) Patent No.: US 7,017,228 B2
(45) Date of Patent: Mar. 28, 2006

(54) PNEUMATIC LOCKING SWIVEL CASTER

(76) Inventors: Harlan Silverstein, 52 River Dr., Titusville, NJ (US) 08560; Gary Schwartz, D12 Avon Dr., East Windsor, NJ (US) 08520

( * ) Notice: Subject to any disclaimer, the term of this patent is extended or adjusted under 35 U.S.C. 154(b) by 0 days.

(21) Appl. No.: 10/674,656

(22) Filed: Sep. 30, 2003

(65) Prior Publication Data

US 2004/0064915 A1    Apr. 8, 2004

Related U.S. Application Data

(60) Provisional application No. 60/415,661, filed on Oct. 2, 2002.

(51) Int. Cl.
*B60B 33/06* (2006.01)

(52) U.S. Cl. ............. 16/35 R; 16/18 R; 16/19; 16/39; 188/1.12; 280/11

(58) Field of Classification Search ............ 16/35 R, 16/18 R, 19, 39; 188/1.12, 18 R, 18 A; 280/79, 280/11

See application file for complete search history.

(56) References Cited

U.S. PATENT DOCUMENTS

| 3,730,307 | A |   | 5/1973 | Mitchell |
| 4,219,186 | A | * | 8/1980 | Brewer ................ 254/9 C |
| 4,679,645 | A | * | 7/1987 | Galloway et al. ........ 180/65.8 |
| 4,722,114 | A |   | 2/1988 | Neumann |
| 4,998,320 | A | * | 3/1991 | Lange ................. 16/35 R |
| 5,184,373 | A |   | 2/1993 | Lange |
| 5,242,035 | A | * | 9/1993 | Lange ................. 188/1.12 |
| 5,303,450 | A | * | 4/1994 | Lange ................. 16/35 D |
| 5,551,715 | A | * | 9/1996 | Pickard .............. 280/43.24 |
| 5,774,936 | A |   | 7/1998 | Vetter |
| 6,550,101 | B1| * | 4/2003 | Plate .................... 16/48 |
| 6,594,951 | B1| * | 7/2003 | Reynolds ............... 47/39 |

FOREIGN PATENT DOCUMENTS

JP            407016029 A  *  1/1995

OTHER PUBLICATIONS

"Triple Swivel Caster", www.fasor.com/centerline/tri_swiv.html (last viewed Jul. 31, 2002).

* cited by examiner

*Primary Examiner*—Brian E. Glessner
*Assistant Examiner*—Mark Williams
(74) *Attorney, Agent, or Firm*—Mark Nowotarski (57) ABSTRACT

A pneumatic locking swivel caster comprises a swivel caster and a locking device which may be activated by fluid pressure. The swivel caster may be a dual wheel swivel caster. An improved theatrical prop or scenery element comprises a pneumatic locking swivel caster and a control system. The control system may comprise a tank filled with pressurized air and a control valve. A pneumatic locking swivel caster may be locked into position by activating the control valve and pressuring the caster with air. The pneumatic locking swivel caster may comprise a triple swivel caster adapted such that all three sets of wheels are locked by air pressure.

2 Claims, 6 Drawing Sheets

(prior art)
PNEUMATIC LOCKING SWIVEL CASTER

CROSS REFERENCE TO RELATED APPLICATION

This application claims the benefit of the filing date of U.S. provisional application entitled, "Pneumatic Locking Swivel Caster", Ser. No. 60/415,661, filed Oct. 2, 2002 and which is incorporated herein by reference.

FIELD OF INVENTION

This invention relates to an improved caster apparatus and method for moving theatre scenery props and locking them into position.

BACKGROUND

One of the ongoing problems in the theatre is how to secure props and scenery elements on the stage quietly and quickly and to then be able to move them also quietly and quickly.

One method for doing this with large scenery elements and props is to move them with an automatic winch. This is very expensive. It is also impractical when more than one production might be performed on the same stage during the same season.

Smaller prop units can be mounted on casters, but these are harder to stop effectively in a fixed position and orientation. Wedges and cane bolts may be used but they are ineffective and awkward. Step on caster brakes are also ineffective. Pianos slip and sofas slide.

A caster used for moving scenery elements is a "swivel caster". A swivel caster comprises two side by side wheels. The side by side wheels reduce "swing wiggle" when the direction of movement of the prop is changed. Swing wiggle refers to the unintended movement of the prop due to the changing orientation of the caster wheels when the direction of movement is changed. This is particularly pronounced when a prop is first moved in one direction and then moved in the opposite direction. Not only does the prop wiggle, but the force required to reverse the motion of the prop can be very high. Swing wiggle must be minimized for prop set up and striking and for props that are moved during a performance, such as props that are danced with.

Figure 6:
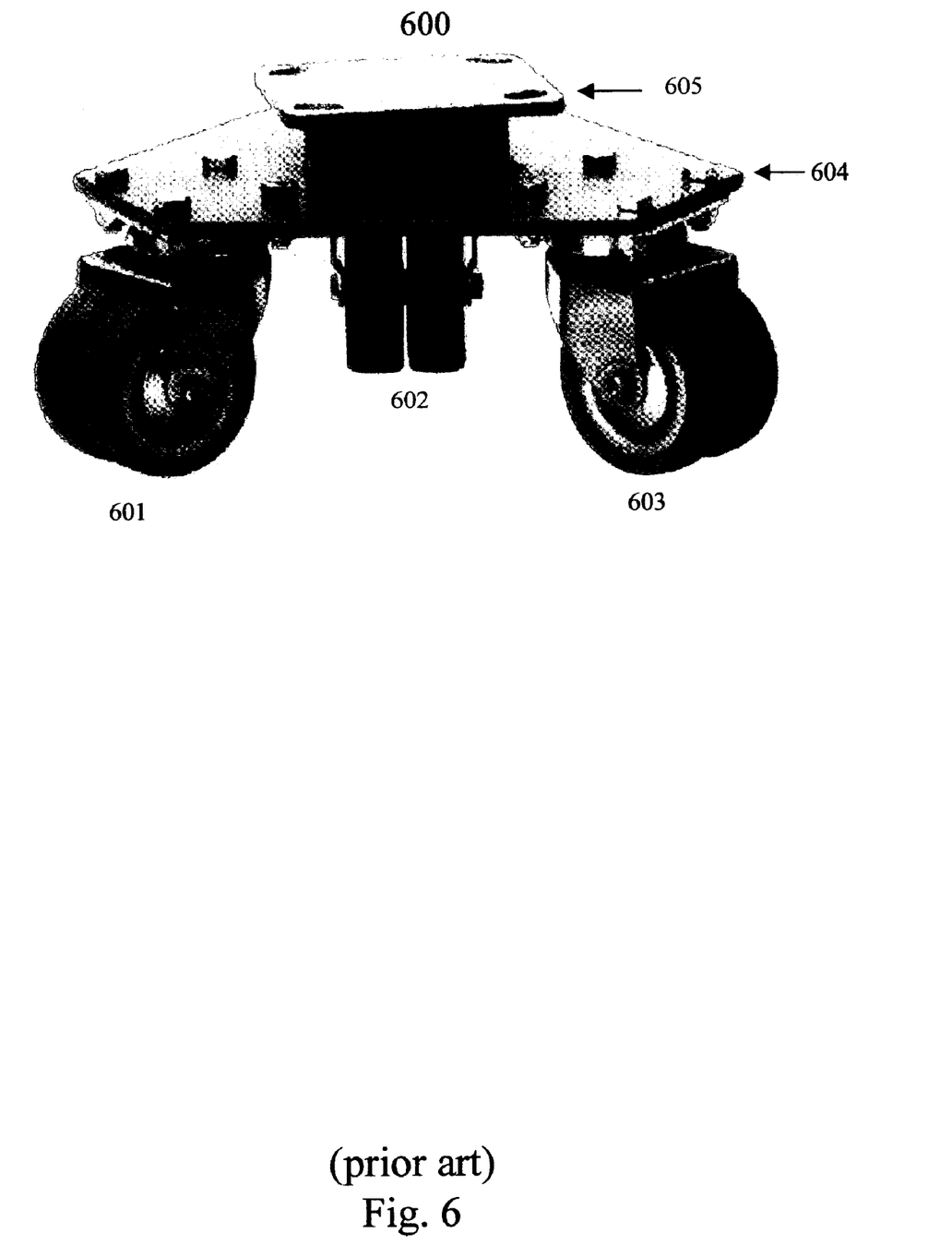
FIG. 6 is a perspective view of a prior art triple swivel caster.

Another caster used for scenery elements is the "triple swivel caster". A prior art triple swivel caster 600 is illustrated in FIG. 6. This caster is sold by Centerline Studios of Cornwall N.Y. The caster is more fully described on web page www.fasor.com/centerline/tri_swiv.html (last viewed Jul. 31, 2002). The triple swivel caster comprises three swivel casters 601, 602, 603, mounted on bottom plate 604. The bottom plate is swivel mounted on top plate 605. The top plate would be attached to the prop or scenery elements that are to be moved. Triple swivel casters are used for heavy props, such as pianos, sofas and the like. Triple swivel casters have very little "swing wiggle".

Portable locking mechanisms are known for casters. U.S. Pat. No. 4,998,320, "Apparatus for Movably Supporting Beds and the Like" by Hans-Willi Lange, describes a portable pneumatic air braking system for single casters mounted on a hospital bed frame. The rolling and swivel motion of the casters are normally prevented due to a spring loaded brake applied thereto. When it is desired to move and rotate the hospital bed, compressed air is pumped into the brake assembly thus forcing the brakes to disengage from both the wheels and the wheel frames. Air is pumped into the brake assembly with a hand pump. This system would not be suitable for a theatre prop due to the large and visible nature of the hand pump and the swing wiggle due to the single wheel casters.

SUMMARY OF THE INVENTION

One embodiment of this invention is a caster for use on a theatre prop which comprises a first wheel and a device to lock the wheel wherein said device to lock the wheel is adapted to lock the wheel in position when said device is pressurized with a fluid.

Another embodiment of this invention is a caster which comprises three dual wheel swivel casters each comprising two wheels, a caster plate assembly, a pneumatic cylinder, and a device to lock said wheels wherein each dual wheel swivel caster is mounted on the caster plate assembly, the caster plate assembly is swivel mounted on the cylinder, and the device to lock said wheels is adapted to lock said wheels.

Another embodiment of this invention is a a control system for operating a pneumatic locking swivel caster which comprises a high pressure gas supply, an activation valve, a first means to connect the high pressure gas supply to the activation valve, and a second means to connect the activation valve to a pneumatic locking swivel caster wherein the high pressure gas supply, first means, activation valve and second means are adapted to provide gas pressure to the pneumatic locking swivel caster in order to lock the wheels of said caster when the activation valve is turned on.

Another embodiment of this invention is a movable object which comprises a body, and a pneumatic locking swivel caster wherein the pneumatic locking swivel caster is mounted on the body such that the object is free to move when the pneumatic locking swivel caster is unlocked and wherein the object is locked into position when the pneumatic locking swivel caster is locked.

Another embodiment of this invention is a method for alternately moving and locking into position an object comprising a pneumatic locking swivel caster, said method comprising moving the object when the pneumatic locking swivel caster is unlocked and locking the object into position by locking the pneumatic locking swivel caster.

Another embodiment of this invention is a theatrical production which comprises props wherein at least one prop comprises a pneumatic locking swivel caster.

Another embodiment of this invention is a dual wheel embodiment of a pneumatic locking swivel caster which comprises a first wheel, a second wheel, and a device to lock the wheel wherein said device comprises a pneumatic cylinder and wherein said device unlocks the first and second wheels when said pneumatic cylinder is pressurized with a fluid.

Another embodiment of this invention is a dual wheel embodiment of a pneumatic locking swivel caster which comprises a first wheel, a second wheel, and a device to lock the wheels wherein said device comprises an electric solenoid and wherein said device either locks or unlocks the first and second wheels when said electric solenoid is energized.

These and other embodiments are described in more detail below.

DETAILED DESCRIPTION OF THE INVENTION

A pneumatic locking swivel caster is an apparatus that facilitates the movement and positioning of props, scenery elements and the like in theatre products or similar applications. It provides a portable means for moving props and scenery elements and then locking them into position quickly and quietly.

Figure 1:
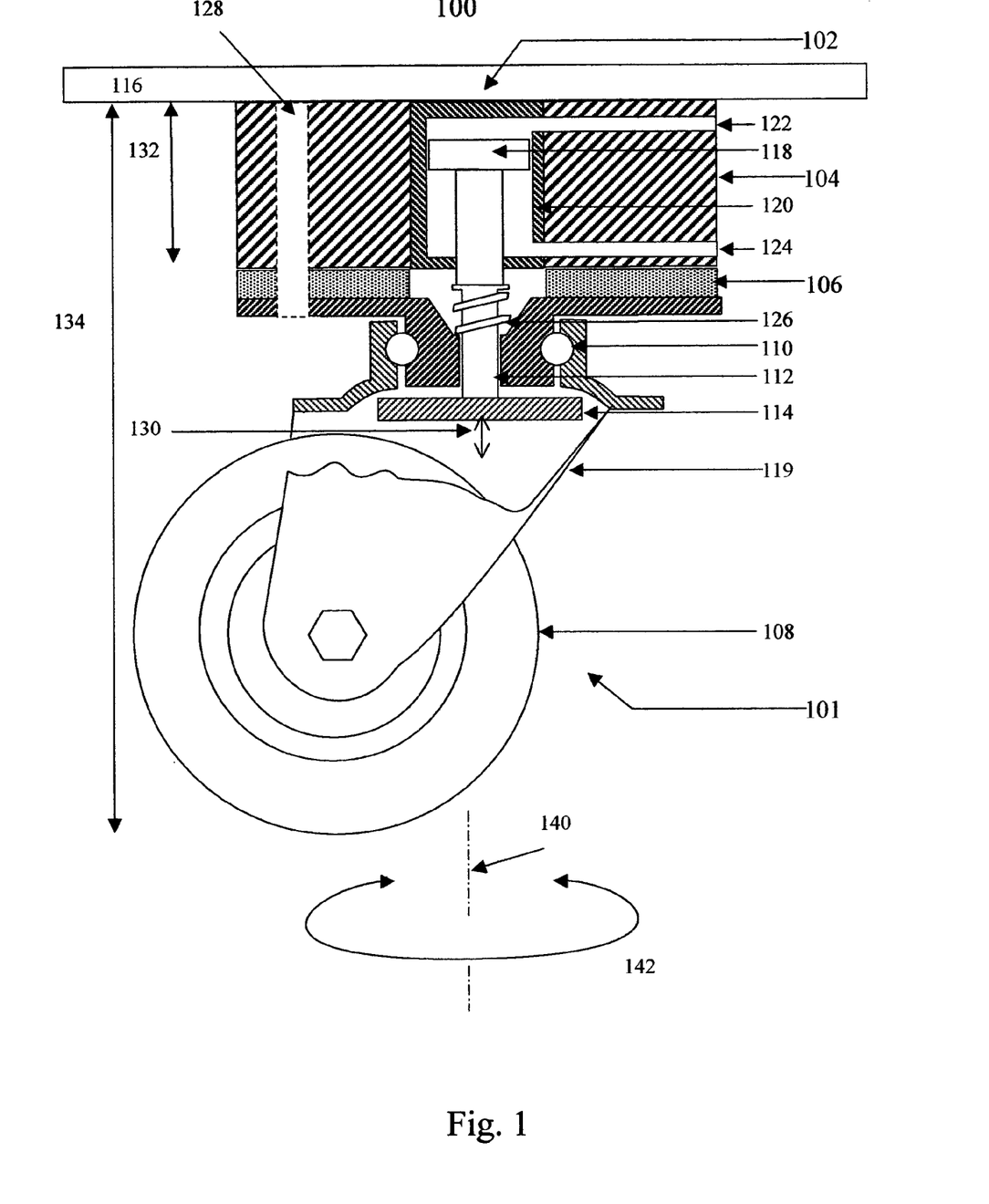
FIG. 1 is a partial cut away side view of a single wheel embodiment of a pneumatic locking swivel caster.

FIG. 1 is a partial cut away side view of a single wheel embodiment 100 of a pneumatic locking swivel caster. The caster comprises wheel assembly 101 and pneumatic cylinder 102. It may additionally comprise mounting block 104 and spacer 106.

The wheel assembly comprises wheel 108, wheel frame 119, spring-loaded pin 112, brake disk 114 and swivel bearing 110. The swivel bearing allows the wheel assembly to swivel 142 about swivel axis 140. The swivel bearing may be a ball bearing, sleeve bearing or other suitable bearing.

Spring-loaded pin 112 is mounted above wheel 108 and passes through the swivel bearing. Brake disk 114 is attached to the bottom of the spring loaded pin. When the pin is pressed down, the brake disk is pressed onto the wheel and thus locks it into position. When the pin is released, spring 126 pushes the pin up and the brake disk disengages from the wheel. The wheel can then roll freely.

The brake disk may be designed to be non-rotatable about the swivel axis. The wheel is then prevented from swiveling when the brake disk is pressed against it.

Alternatively, the brake disk may be designed to be rotatable about the swivel axis. In that case, the wheel may swivel when the brake disk is pressed against it.

Alternative spring loaded brake means may be used. One example is a metal tab attached to the wheel frame. One end of the tab is attached to the wheel frame. The other is free to flex. The tab is designed such that when it is pressed down, the free end moves down and presses onto the wheel and locks it. The stiffness of the tab is selected such that it springs up and releases the wheel when it is no longer pressed down.

The pneumatic cylinder 102 comprises piston 118, cylinder wall 120, pressure orifice 122, and optionally vent orifice 124. The piston is positioned above the spring loaded pin such that when fluid at greater than ambient pressure is delivered to the pressure orifice, the pneumatic cylinder is pressurized and the piston pushes the spring loaded pin down. This presses the brake disk against the wheel. As the piston is moved down, air in the cylinder below the piston is forced out through the vent orifice. If no vent orifice is present, then the space below the piston becomes pressurized or air leaves through leaks.

A suitable fluid for pressurizing the cylinder is air. Other gases such as nitrogen and carbon dioxide may also be used provided they do not create an undue hazard. Liquids, such as oils, may be used, provided that there are no leaks in the system.

When pressurized fluid is removed from the pressure orifice, the pressure in the pneumatic cylinder 102 is reduced and the piston, spring loaded pin and brake disk move up thus releasing the wheel.

Pressures of 5 to 100 psig (0.3 to 7 atmospheres) and greater at the pressure orifice are suitable for locking the wheel.

Mounting block 104 houses pneumatic cylinder 102. It also provides a means for mounting the pneumatic locking swivel caster to prop body 116. The mounting block preferably comprises at least one mounting bolt hole 128. The mounting bolt hole may have a 5/16 inch (0.79 cm) diameter. The 5/16 inch diameter allows the use of either standard 1/4 inch (0.63 cm) bolts or standard 3/8 inch (0.95 cm) bolts for the same hole. If a 1/4 bolt is used, the bolt passes through the hole. Nuts or other similar means are used to secure it. If a 3/8 inch bolt is used, the 5/16 inch mounting bolt hole is tapped and the bolt is threaded into the tapped holes and secured.

There are preferably four mounting bolt holes (not shown) in the mounting block. Each bolt hole is positioned near a corner of the block.

The mounting block may be made of aluminum or other material that is lightweight, strong and machines easily. Plastics, such as Teflon™, are suitable. Steel may also be used A suitable thickness 132 for the mounting block is in the range of 0.5" to 5.0" (1.3 to 13 cm).

A preferred thickness for the mounting block is about 1.5" (3.8 cm). The mounting block should be at least as thick as the brake disk travel distance 130.

The prop body 116 may be attached on any surface of the mounting block. The prop body may alternatively be mounted between the mounting block and the wheel assembly.

Spacer 106 is mounted between the mounting block and the wheel assembly. The spacer thickness is selected such that the wheel is a desired distance from the prop body.

The caster may be mounted in an over slung condition.

A suitable height 134 of the pneumatic locking swivel caster is 2 inches to 20 inches (5 to 50 cm).

A preferred height of the pneumatic locking swivel caster is about 5.5 inches (14 cm). This is comparable to a normal swivel caster height and allows the pneumatic locking swivel caster to be retrofitted on existing props with normal casters. Larger heights can be used for larger desired distances between the prop body and floor.

The pneumatic locking swivel caster can be used in combination with other locking casters or in combination with non-locking casters on the same prop body.

The pneumatic locking swivel caster does not necessarily have to swivel. A non-swiveling caster may be suitable in some applications, such as when a prop is to move only in one direction.

Figure 2:
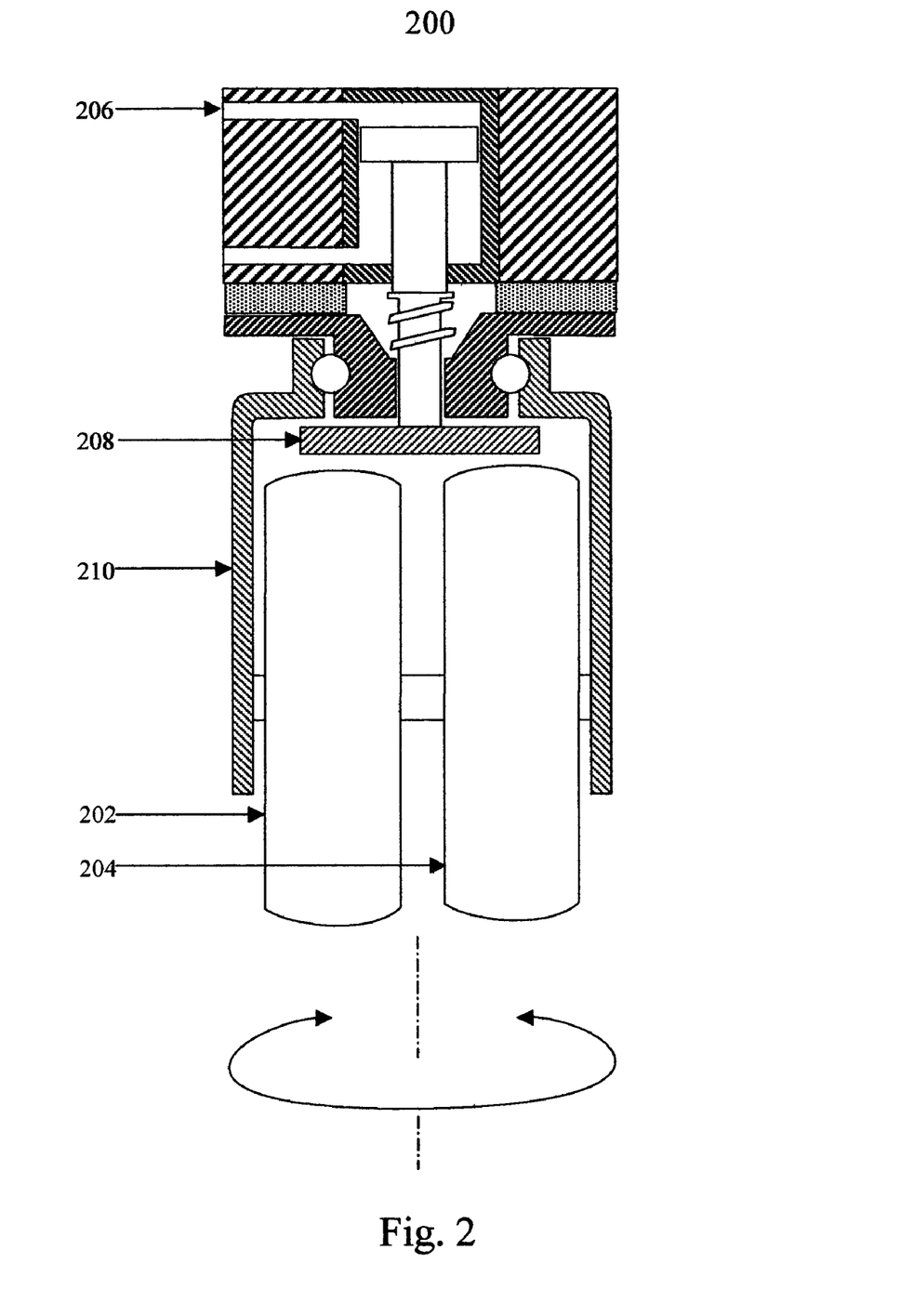
FIG. 2 is a cut away front view of a dual wheel embodiment of the pneumatic locking swivel caster.

FIG. 2 is a cut away front view of a dual wheel embodiment 200 of the pneumatic locking swivel caster. The dual wheel embodiment 200 is the essentially the same as the single wheel embodiment 100 except that there are two wheels 202, 204 mounted side by side in the wheel frame 210. The dual wheel configuration is preferred in theatre productions since it requires less force to swivel when the prop changes direction. There is also less swing wiggle of the prop as it changes direction. The reduced force to change direction is important in applications where a prop is moved in one direction to position it and then moved in the opposite direction to remove it. Reduced swing wiggle is important when a prop is moved during a performance, such as when an actor dances with the prop.

The dual wheel embodiment is operated in the same way as the single wheel embodiment. Fluid pressure is applied to pressure orifice 206. This causes the brake disk 208 to move down and press against the wheels. Both wheels are preferably braked simultaneously.

Figure 3:
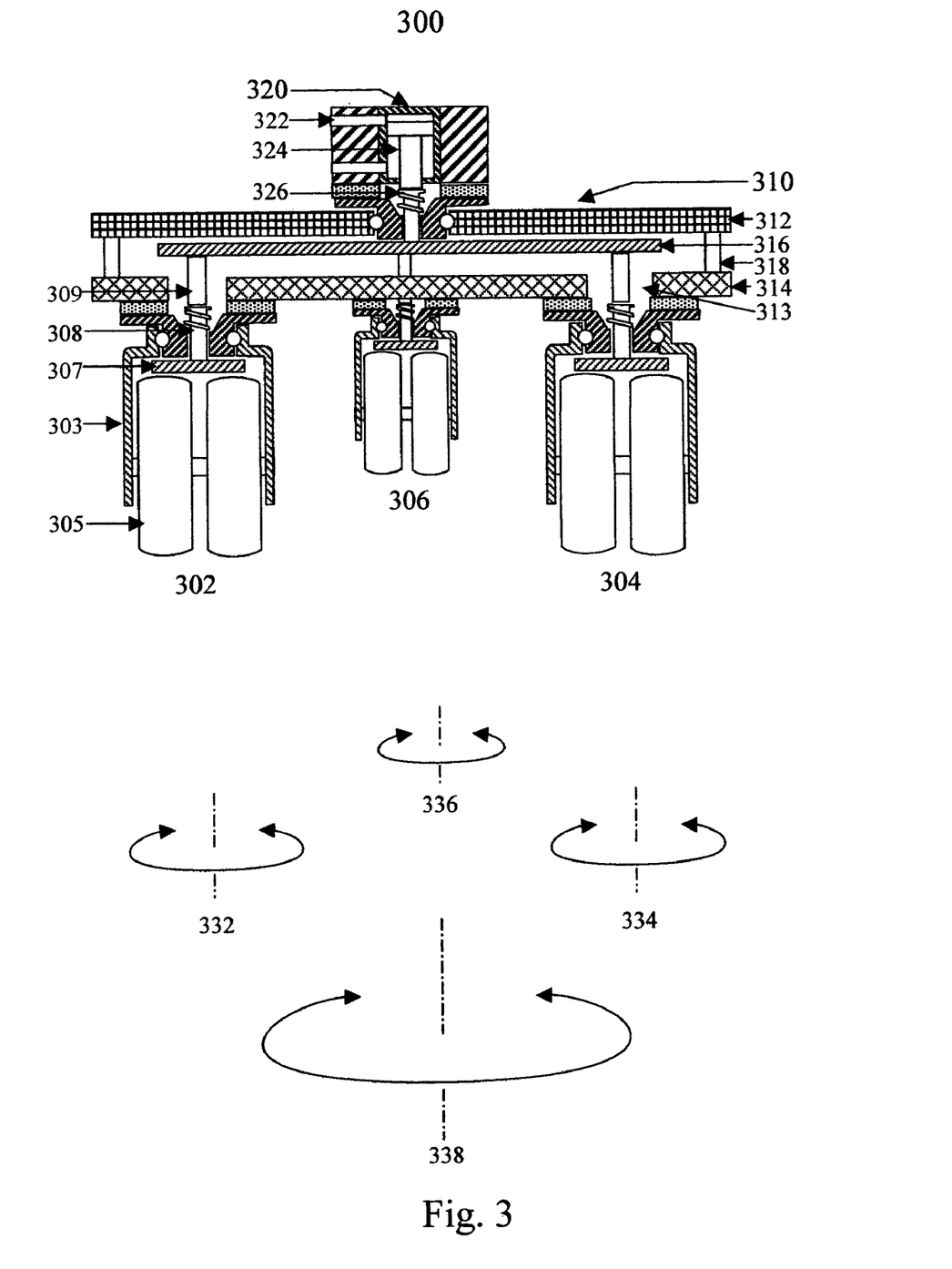
FIG. 3 is a cut away front view of a triple swivel caster embodiment of the pneumatic locking swivel caster.
Figure 4:
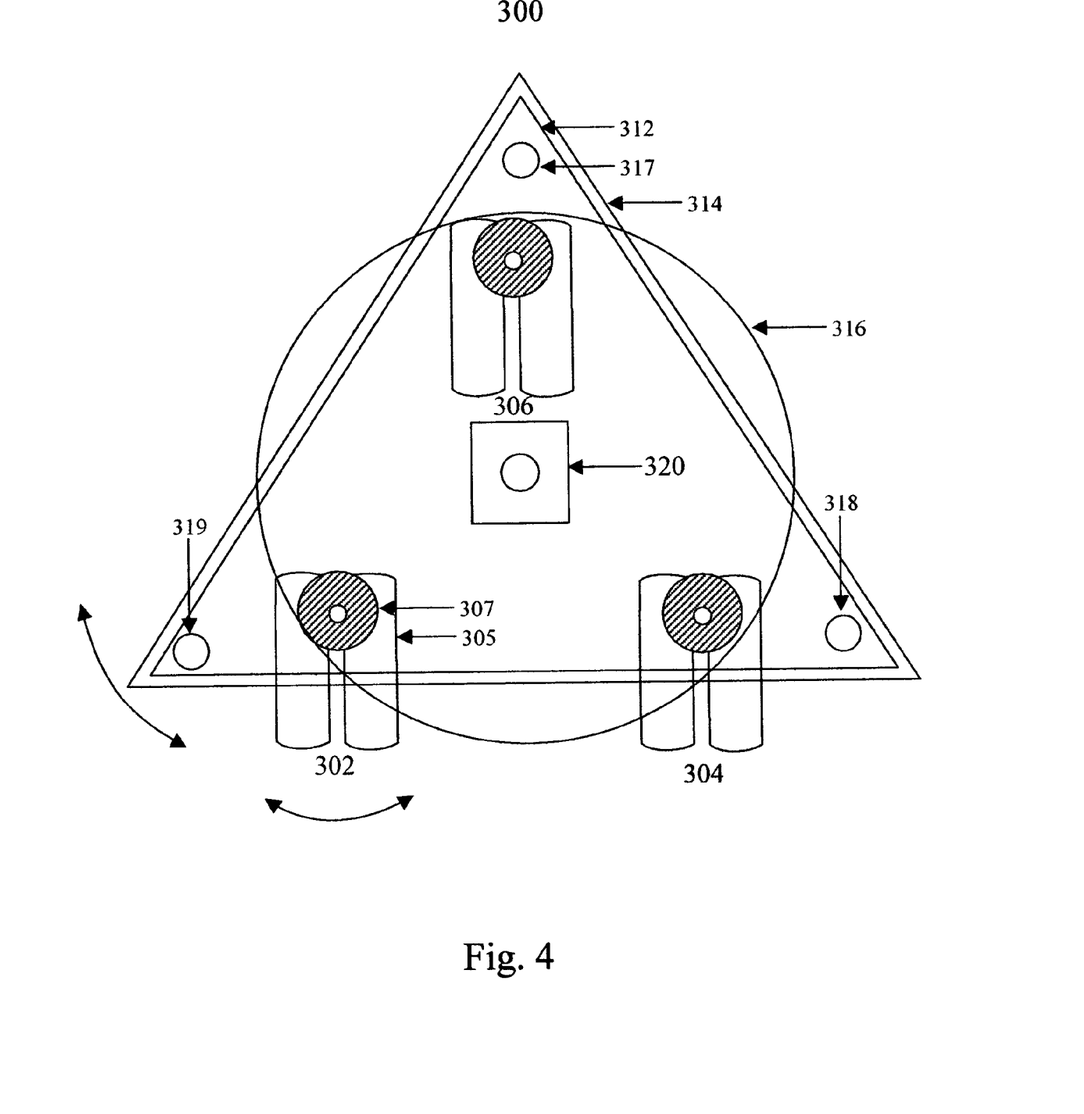
FIG. 4 is a semi transparent plan view of the same embodiment as FIG. 3.

FIG. 3 is a cut away front view of a triple swivel caster embodiment 300 of the pneumatic locking swivel caster. FIG. 4 is a plan view of the same embodiment. The triple swivel caster embodiment comprises three dual wheel assemblies 302, 304, and 306 swivel mounted on caster plate assembly 310. Each dual wheel assembly is the same size. Different sizes may be used, however, depending upon the application. The caster plate assembly is swivel mounted on pneumatic cylinder 320.

In FIG. 3, dual wheel assembly 306 is shown smaller than the other dual wheel assemblies to indicate that it is further back from the viewer. It is also shown partially blocked by lower plate 314 for the same reason.

In FIG. 4, most elements are shown by transparent outlines to indicate their relative horizontal position.

The caster plate assembly is swivel mounted on pneumatic cylinder 320.

Each dual wheel assembly is free to swivel about its respective swivel axis 332, 334, 336, when its wheels are not braked. The caster plate assembly is also free to swivel about its own swivel axis 338 when the wheels are not braked. When mounted on a prop (not shown), this configuration requires very low incremental force to change the direction of prop movement. It also has very little swing wiggle.

In operation, all three dual wheel assemblies are preferably braked simultaneously by the application of fluid pressure to pneumatic cylinder 320, as will be described in more detail below.

Each dual wheel assembly comprises two wheels 305 mounted in a wheel frame 303, a braking disk 307, a spring loaded pin 308 and an extension pin 309. During braking, the extension pin, spring loaded pin and braking disk in each dual wheel assembly are pressed down against their respective two wheels in order to lock them.

The caster plate assembly 310 comprises an upper plate 312, lower plate 314, at least one stand off pin 318 and a press plate 316. The upper plate and lower plate are connected by the at least one stand off pin to form a gap therebetween. Three stand off pins 317, 318, 319, are shown in FIG. 4. Each stand off pin is located near a dual wheel assembly and is outboard of the press plate.

FIG. 4 shows the shape of the upper and lower plates to be triangular. Any suitable shape may be used, however. Large holes, for example, may be drilled in the plates to reduce weight without unduly compromising strength.

The press plate resides within the gap and is attached to or rests upon the extension pins. FIG. 4 shows the press plate in the shape of a disk. This insures that the press plate is always above the extensions pins. Other shapes and configurations may be used provided that the caster plate assembly is free to swivel and provided that the press plate will press down on the extension pins regardless of the swivel orientation of the extension pins relative to the press plate.

During braking, the press plate pushes down upon the extension pins and thus causes the braking disks to press against their respective wheels. The gap between the upper and lower plate should be large enough to accommodate the expected vertical motion of the braking plate.

Holes 313 are provided in the lower plate to allow the extension pins to pass through. Other suitable means, besides holes, for allowing the transmission of the force of the press plate through the lower plate may be used, such as a flexible diaphragm.

Pneumatic cylinder 320 comprises spring loaded pin 326, piston 324 and pressure orifice 322. During braking, pressurized fluid is admitted to the pressure orifice. This pushes the piston and spring loaded pin down. This in turn pushes the press plate down thus causing the braking disks to press against the wheels.

Not all of the spring loaded pins require springs. The spring in spring loaded pin 326 in the pneumatic cylinder, for example, may be eliminated. Some means must be provided, however, to disengage the braking disks from the wheels when the pneumatic cylinder is depressurized.

Figure 5:
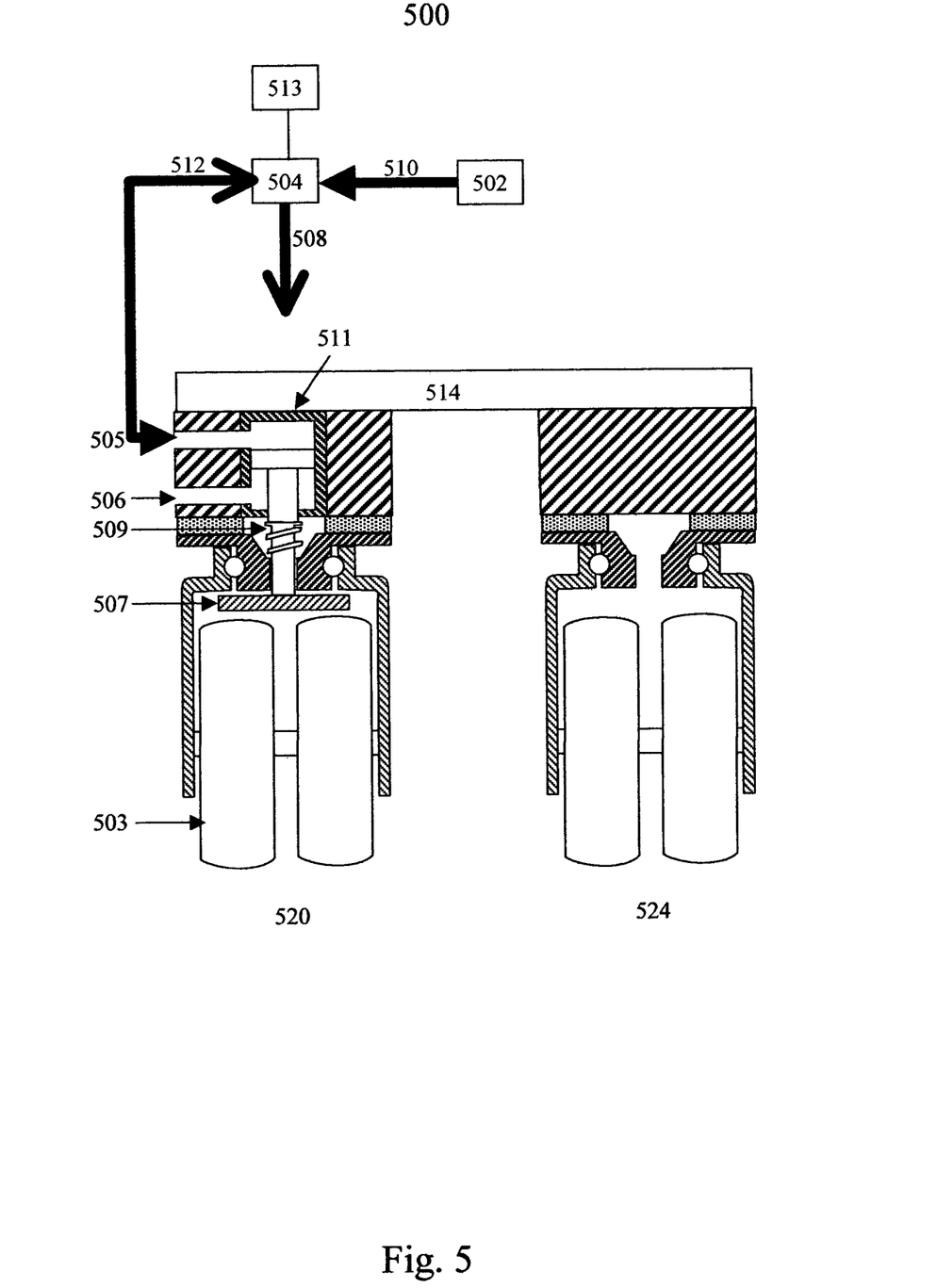
FIG. 5 is a schematic of a control system suitable for a pneumatic locking swivel caster.

FIG. 5 is a schematic of control system 500 suitable for the pneumatic locking swivel caster. The control system comprises high pressure gas supply 502, first gas line 510, activation valve 504, and second gas line 512. The high pressure gas supply is connected to the activation valve by the first gas line. The activation valve is connected to the pressure orifice 505 of at least one pneumatic locking swivel caster 520 by second gas line 512.

Control system 500, at least one pneumatic locking swivel caster 520 and optionally at least one conventional caster 524 are mounted on prop body 514. The number and position of the casters will be chosen to provide adequate support for the prop. The location of the control system will be such that it does not detract from the visual appearance of the prop. Locating the control system under the prop is generally effective. A switch 513 for valve 504 should be readily accessible to the person moving the prop. The valve may be integrated into the high pressure gas supply. Line 510 then becomes a connection. Similarly, valve 504 may be integrated into the locking caster 520

Solid head arrows on gas lines in FIG. 5 indicate the direction of gas flow when the activation valve is turned on. Line head arrows indicate the direction of gas flow when the activation valve is turned off.

In order to lock caster 520, the activation valve is turned on. This provides high pressure gas from the high pressure gas supply to pressure orifice 505 and hence cylinder 511 of the caster via gas lines 510 and 512. The high pressure gas pushes brake disk 507 down upon wheels 503.

In order to unlock caster 520, the activation valve is turned off. This connects the pressure orifice to vent 508 via second gas line 512. This depressurizes cylinder 511 and spring 509 pushes the brake disk up.

The activation valve may be a mechanical valve, electrically operated solenoid valve, pneumatically operated solenoid valve, remote controlled valve or other suitable valve.

The control system and pneumatic locking swivel caster may be configured such that putting pressure in the pressure orifice releases the wheels rather than locks the wheels. This may be accomplished by attaching the second gas line to the vent orifice 506. The pressure orifice is then open to the air. The spring is reconfigured such than it pushes the brake disk down onto the wheels when there is no pressure in cylinder 511. This is suitable for applications where the object the pneumatic locking swivel caster is mounted on is to be locked in position for relatively long periods of time and moved for relatively short periods of time.

Using pressure to brake the wheels, however, is preferred in a theatre application. Props are normally only braked during relatively short times, such as during a performance. For most of the time, such as between performances, they are unbraked. The system would be functional, however, if pressure was used to unlock the wheels.

The system would be also be functional if electrical solenoids operated by batteries were used instead of gas cylinders to brake the wheels. Using gas to brake the wheels is preferred in theatre applications, however, due to the fact that the gas system in clean, quiet, low cost and can be quickly recharged between performances.

The high pressure gas supply may be a tank. The tank may have a volume of 2 cubic feet (50 liters). The tank may also have a volume as small as the displacement volume of the cylinder 511. Tank volumes as small as one cubic inch (0.016 liters) may be suitable for gas tank pressures of about 100 psig (7 atmospheres). Even smaller tank volumes may be functional for higher pressure gas supplies, such as a CO2 cartridge.

The tank may be pressurized to 100 psig (7 atmospheres) with air from a compressor prior to use. The tank may comprise a pressure regulator that reduces the pressure of the gas delivered to the activation valve to a set pressure. This helps insure consistent operation of the control system as the air in the tank is used up.

The pressure in the tank may also be several thousand psig (several hundred atmospheres). This is a common pressure found in compressed gas cylinders purchased from a welding supply store.

The gas in the tank may be an industrial gas such as carbon dioxide, nitrogen or helium. Any gas that does not provide an undue safety hazard may be suitable.

EXAMPLE 1

Four dual wheel embodiments of a pneumatic locking swivel caster and a control system are mounted on a grand piano stage prop body. The high pressure gas supply comprises a metal tank with a volume of two cubic feet (50 liters). The tank is pressurized with air to 100 psig (7 atmospheres). The high pressure air supply further comprises a regulator that reduces the pressure in the first gas line to 40 psig (2.7 atmospheres). The activation valve is a mechanical three way valve. Each piston in the pneumatic locking swivel casters has a diameter of about one inch (2.5 cm). The height of the pneumatic locking swivel casters from the bottom of the wheels to the top of the mounting block is 5.5 inches (14 cm). The combined thickness of the mounting block and spacer is 1.5 inches (3.8 cm). There are four mounting holes in each mounting block. The mounting holes have a diameter of 5/16 inch (0.79 cm).

When the switch is turned on, 40 psig of gas pressure is delivered to the casters. The brake disks of the casters are pushed down onto the wheels. The force on the brake disks is about 40 pounds (18 kg).

When the switch is turned off, the pressure at the pressure orifice is reduced to ambient. The springs in the spring loaded pins push the brake disks up and the wheels are free to rotate and swivel.

There is no undue motion of the prop body when the switch is turned on or off. The system is leak tight, so there is no audible noise from the casters while the wheels are locked.

A triple swivel locking caster and associated control system is mounted on both a bed prop body and a sofa prop body with similar results.

Having thus described the invention with particular reference to the embodiments thereof, it will be obvious that various changes and modifications can be made therein without departing from the spirit and scope of the present invention as defined in the appended claims.

The invention claimed is:

1. A caster which comprises:
three dual wheel swivel casters each comprising two wheels;
a caster plate assembly;
a pneumatic cylinder; and
a device to lock said wheels wherein:
 a) each dual wheel swivel caster is mounted on the caster plate assembly such that said dual wheel swivel casters do not have undue motion when said device to lock said wheels locks said wheels;
 b) the caster plate assembly is swivel mounted on the cylinder;
 c) the device to lock said wheels is adapted to lock said wheels;
 d) the caster plate assembly comprises;
  i. an upper plate;
  ii. a lower plate; and
  iii. at least one stand off pin;
 e) and where the device to lock the wheels comprises:
  i. a pneumatic cylinder;
  ii. a press plate;
  iii. three brake disks;
  iv. three spring loaded pins; and
  v. three extension pins;
wherein:
 f) the upper plate is attached to the lower plate with the at least one stand off pin such that there is a gap between the upper plate and the lower plate;
 g) the press plate is mounted in said gap;
 h) each one of the brake disks, each one of the spring loaded pins and each one of the extension pins are mounted in each one of the dual wheel swivel casters such that the brake disks will be pushed against the wheels when the press plate is pushed down;
 i) and wherein the pneumatic cylinder is adapted to push the press plate down when the pneumatic cylinder is pressurized thus locking the wheels.

2. A caster which comprises:
three dual wheel swivel casters each comprising two wheels;
a caster plate assembly;
a pneumatic cylinder; and
a device to lock said wheels wherein:
 each dual wheel swivel caster is mounted on the caster plate assembly;
 the caster plate assembly is swivel mounted on the cylinder;
 the device to lock said wheels is adapted to lock said wheels; and
 the caster plate assembly comprises:
an upper plate;
a lower plate; and
at least one stand off pin;
and where the device to lock the wheels comprises:
 a pneumatic cylinder;
 a press plate;
 three brake disks;
 three spring loaded pins; and
 three extension pins;
wherein:
 the upper plate is attached to the lower plate with the at least one stand off pin such that there is a gap between the upper plate and the lower plate;
 the press plate is mounted in said gap;

each one of the brake disks, each one of the spring loaded pins and each one of the extension pins are mounted in each one of the dual wheel swivel casters such that the brake disks will be pushed against the wheels when the press plate is pushed down; and wherein the pneumatic cylinder is adapted to push the press plate down when the pneumatic cylinder is pressurized thus locking the wheels.

* * * * *